Aug. 1, 1950     H. G. WATSON     2,517,065
COLLAPSIBLE CARRIER

Filed April 28, 1948     2 Sheets-Sheet 1

INVENTOR
HUGH GLASS WATSON

BY *J. Harold Mechlo*

ATTORNEY

Aug. 1, 1950     H. G. WATSON     2,517,065
COLLAPSIBLE CARRIER
Filed April 28, 1948     2 Sheets-Sheet 2
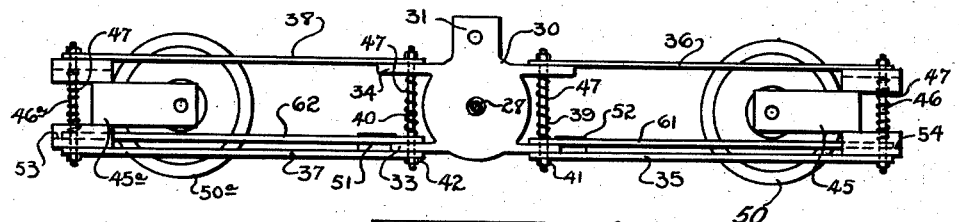
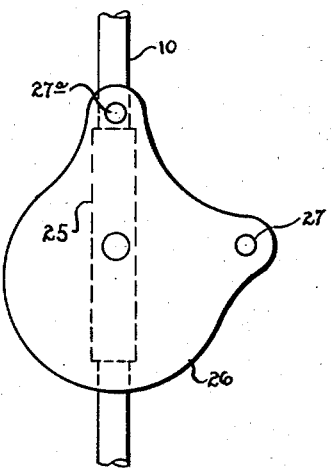 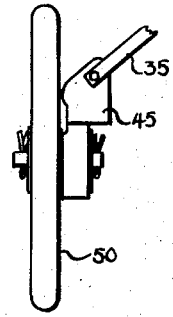
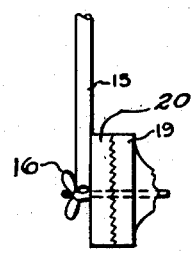
INVENTOR
HUGH GLASS WATSON
BY *J. Harold Hughes*
ATTORNEY Patented Aug. 1, 1950

2,517,065

UNITED STATES PATENT OFFICE 2,517,065

COLLAPSIBLE CARRIER

Hugh Glass Watson, Toronto, Ontario, Canada

Application April 28, 1948, Serial No. 23,652

3 Claims. (Cl. 280—38)

This invention relates to a collapsible carrier, and is particularly directed to providing improvements in wheeled carriers of the type used for carrying golf bags.

Golf bag carriers are well known and are relatively widely used for carrying golf bags and clubs over golf courses. Usually, they are in the form of a frame adapted to receive and carry a golf bag and are supported on wheels. The carrier is designed so that it may be moved from place to place and is self-supporting in an upright position in which the golf clubs are readily accessible and is usually collapsible for storage in a limited space.

One of the important objects of this invention is to provide a light and sturdy golf bag carrier which may be moved easily from place to place and which stands in an upright position in which the golf clubs are readily accessible.

A further important object of this invention is to provide improvements in the construction of golf bag carriers by means of which the carrier, when in use, is supported firmly without danger of collapse, and which may be collapsed quickly and easily for storage in a very restricted space.

A still further object of this invention is to provide a collapsible carrier which may be manufactured inexpensively and which is sturdy and durable in use.

The carrier of the present invention comprises in general, a frame, an undercarriage pivotally secured to said frame and adapted to be locked in extended and collapsed positions respectively at right angles and parallel to the long axis of the frame, a wheel rotatably mounted at each end of the undercarriage, and securable to the undercarriage with the wheel axis respectively parallel and at right angles to the plane of the long axis of the undercarriage.

An understanding of the manner in which the above and other objects of this invention may be attained may be had from the following description, reference being made to the accompanying drawings, in which:

Figure 4 is a top plan view of the undercarriage;

Figure 5 is a bottom plan view of the frame;

Figure 6 is a detail view of the wheel mounting; and

Figure 7 is a detail view of the handle mounting.

Like reference characters refer to like parts throughout the specification and drawings.

Figure 1:
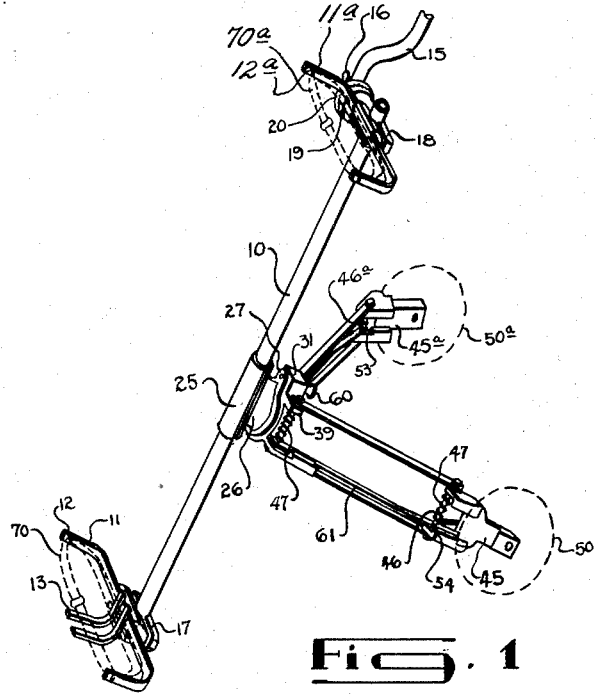
Figure 1 is a perspective view of the carrier illustrating the undercarriage in an extended position.
Figure 2:
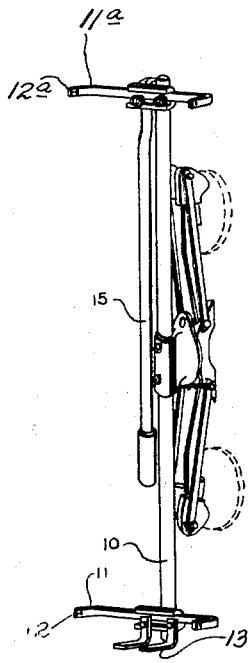
Figure 2 is a perspective view illustrating the carrier in a collapsed position.
Figure 3:
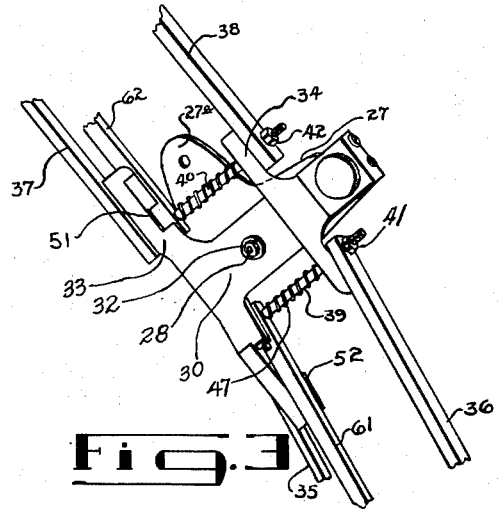
Figure 3 is an enlarged bottom plan view slightly in perspective of the central portion of the undercarriage.

The carrier comprises a carrier member or frame 10 consisting preferably of a single tubular member. U-shaped members 11 and 11a are secured respectively at the rearward and forward ends of the tubular member. These U-shaped members are adapted to receive and partially enclose a golf bag, not shown, which may be secured in place by straps 70—70a passed through the slots 12 and 12a or rivetted to the U-shaped members as desired. The top and bottom portions of each strap 12—12a are preferably adjustable to secure the golf bag firmly in place and support it slightly above the U-shaped members so that it will not become scuffed or worn by contact with those members. A support for the base of the golf bag is provided in the form of one or more upright members 13 rigidly secured to the rearward end of the tubular member.

A handle 15 is pivotally secured to the forward end of frame and is locked at any predetermined desired angle to the horizontal by a wing nut 16.

Preferably, the U-shaped members 11—11a are rigidly clamped to the tubular member 10, by clamps 17 and 18. A plate 19 having a serrated exterior surface is carried by the forward clamping member 18 and a plate 20 having a serrated exterior surface, is carried by the rearward end of th handle 15. The opposing serrated surfaces of the plates 19 and 20 are locked together by the wing nut 16 turned on a bolt which extends through the plates 19 and 20.

A housing is secured to the tubular member 10 about midway of its length and preferably slightly to the rearward of its centre of gravity, normally to cause the carrier, when loaded with a golf bag and clubs to tilt rearwardly to rest against the rearward end of the member 10 with the bag in an upright position.

The housing is preferably in the form of a tubular member 25 adapted to clamp tightly around the member 10 and terminate below the member 10 in a block 26 having drilled projections 27 and 27a respectively parallel and at right angles to the long axis of the tubular member 10. A bolt 28 is extended through the block 26.

An H-shaped frame is pivotally attached to the block 26 by the bolt 28 and is secured in pivotal relation thereto by a nut 32. This frame comprises a transverse member 30 having a drilled projection 31 adapted to mate with one or other of the projections 27—27a. A spring urged pin 60 terminating in an exterior knob is mounted in the drilled passageway in the projection 31 and is adapted to fit into one or other of the drilled passageways in the projections 27—27a to hold the frame in one or other of its fixed positions in relation to the tubular member 10.

Spaced apart extensions 33 and 34 are secured to and extend a short distance in each direction at right angles to the transverse member 30. The inward ends of the pair of spaced wheel supporting members 35 and 36 are pivotally secured to one end of the spaced arms 33—34 by a bolt 39 which extends transversely of the spaced extensions and through the ends of the wheel supporting members 35 and 36. Similarly, the inward ends of the pair of spaced wheel supporting members 37 and 38 are pivotally secured to the other ends of the extensions 33—34 by the bolt 40 which extends through the ends of the extensions and through the ends of the wheel supporting members 37 and 38. The bolts 39 and 40 are secured in position by nuts 41 and 42.

The outward ends of the spaced wheel supporting members are pivotally secured at their outward ends to the bifurcated ends of blocks 45—45a by bolts 46—46a which extend through the bifurcated ends of the blocks and through the outward ends of the wheel supporting members. Wheels 50 and 50a are rotatably attached to the blocks 45—45a respectively.

A rod or strut 61 is extended from the bolt 39 to the bolt 46, the bolts being passed through openings adjacent to the ends of the strut between the adjacent ends of the extensions 33 and 34. The strut is resiliently urged at its inward end into a seat 52 provided on the adjacent end of the extension 33 and is resiliently urged at its outward end into a seat 54 provided in the inner face of the bifurcated end of the block 45. A similar strut 62 is extended from the bolt 40 to the bolt 46a, and is resiliently urged into seats 51 and 53 provided in the adjacent end of the extension 33 and the block 45a respectively. Compression springs 47 are mounted on the bolts 39, 40, 46 and 46a for the purpose of urging the struts into their respective seats. The struts may be of any relatively strong material, and are preferably of spring steel to absorb shock when the carrier is moved over rough ground.

In use, the undercarriage comprising the H-shaped frame, the wheel supporting members and the wheels is normally locked in an extended position at right angles to the plane of the long axis of the tubular member 10. In this position, the wheel supporting members extend outwardly at an angle to the horizontal and the wheels are supported vertically by the ground. The inward ends of the struts 60 and 61 are seated firmly in this extended position in seats 51—52 carried by the outward ends of the extensions 33 and the outward ends of the struts are seated firmly in seats 53—54. In this position, the struts are retained firmly in their respective seats by the springs 47.

The undercarriage is collapsed by drawing the outward ends of the struts 61—62 out of their seats against the resistance of the springs 47. This permits the blocks to be turned inwardly to cause the wheels to underlie the outward ends of the respective wheel supporting members in a position approximately parallel to the wheel supporting members 35, 36, 37, and 38. The inward ends of the struts are then drawn out of their respective seats which permits the struts and the wheel supporting members to be raised to an angle approximately 90° to the plane of the long axis of the tubular member 10. In this position, the struts 61 and 62 are firmly locked in the reverse sides of the seats 52—54 and 51—53, these seats being designed to receive and secure the struts in their positions. The pin 60 is then drawn out of the hole in projection 27 to permit the H-shaped frame to be pivoted through 90° carrying the wheel supporting members to a position parallel to the long axis of the tubular member and the pin 60 is urged by its spring into the opening 27a to hold the parts in this position. The nut 16 is loosened to permit the handle 15 to be pivoted backwardly to lie along the tubular member and the nut is tightened to retain it in this position. The sequence of operations in extending and collapsing the parts is, of course, optional with the user. In its collapsed condition, the carrier is very compact and may be stored in a conventional club room locker.

The carrier of the present invention has several important advantages. The parts may be manufactured and assembled easily and inexpensively. In use, it is light, sturdy and durable and may be drawn easily over the type of terrain common to golf courses. When out of use, it may be collapsed to a small, compact size for storage purposes.

It will be understood, of course, that modifications may be made in the preferred embodiment of the invention described and illustrated herein without departing from the scope of the invention as defined by the appended claims.

What I claim as new and desire to protect by Letters Patent of the United States is:

1. A collapsible carrier comprising a tubular member, a U-shaped member at each end of the tubular member, a housing carried by the tubular member between the ends thereof, a frame pivotally secured to the underside of the housing, spaced extensions carried by opposing sides of said frame, resiliently spaced wheel supporting members pivotally secured to said extensions, wheel housings pivotally secured to the outward ends of the wheel supporting members, means for locking the wheel housings and wheel supporting members in their operative positions, and means for releasing said members from their locked positions.

2. A collapsible carrier comprising a carrier member, a frame secured to the underside of said carrier member between the ends thereof, extensions carried by opposite sides of said frame, spaced wheel supporting members pivotally secured to said extensions, wheel housings pivotally secured to the outward ends of the wheel supporting members, latches carried by said extensions extending between said wheel supporting members and latches carried by said wheel housings extending between said wheel supporting members, and an arm adapted to move with and positioned between each set of spaced wheel supporting members normally resiliently urged into said latches.

3. A collapsible carrier comprising a carrier member, a housing carried by the carrier member between the ends thereof, a frame rotatably secured to the underside of the housing, releasable means for locking said frame at a selected angle to the carrier member, spaced extensions carried by opposite sides of said frame, spaced wheel supporting members pivotally secured to said extensions, wheel housings pivotally secured to the outward ends of the wheel supporting members, latches carried by said extensions extending between said wheel supporting members and latches carried by said wheel housings extending between said wheel supporting members, and an arm adapted to move with and positioned between each set of spaced wheel supporting members normally resiliently urged into said latches.

HUGH GLASS WATSON.

REFERENCES CITED

The following references are of record in the file of this patent:

UNITED STATES PATENTS

| Number | Name | Date |
|---|---|---|
| 669,222 | Ruher | Mar. 5, 1901 |
| 1,276,067 | Hurd | Aug. 20, 1918 |
| 1,542,621 | Longstreet et al. | June 16, 1925 |
| 2,443,847 | Williamson | June 22, 1948 |